(12) United States Patent
Isereau et al.

(10) Patent No.: US 10,915,152 B2
(45) Date of Patent: Feb. 9, 2021

(54) SCALABLE HIGH-PERFORMANCE EMBEDDED COMPUTING SYSTEMS

(71) Applicant: SRC, Inc., North Syracuse, NY (US)

(72) Inventors: Darrek J. Isereau, Brewerton, NY (US); Christopher T. Capraro, Utica, NY (US); Mark D. Barnell, North Syracuse, NY (US)

(73) Assignee: SRC, Inc., North Syracuse, NY (US)

( * ) Notice: Subject to any disclaimer, the term of this patent is extended or adjusted under 35 U.S.C. 154(b) by 608 days.

(21) Appl. No.: 15/497,944

(22) Filed: Apr. 26, 2017

(65) Prior Publication Data

US 2018/0018004 A1 Jan. 18, 2018

Related U.S. Application Data

(60) Provisional application No. 62/327,622, filed on Apr. 26, 2016.

(51) Int. Cl.
*G06F 1/20* (2006.01)
*G06F 13/36* (2006.01)

(52) U.S. Cl.
CPC .............. *G06F 1/206* (2013.01); *G06F 13/36* (2013.01)

(58) Field of Classification Search
CPC ................................. G06F 1/206; G06F 13/36
See application file for complete search history.

(56) References Cited

U.S. PATENT DOCUMENTS

| 3,440,654 | A | | 4/1969 | Neuendorf et al. | |
|---|---|---|---|---|---|
| 4,635,709 | A | * | 1/1987 | Altoz | F28D 15/0233 165/104.33 |
| 4,709,239 | A | * | 11/1987 | Herrick | H01Q 9/0442 333/246 |
| 4,869,071 | A | * | 9/1989 | Wehner | B64D 13/00 62/133 |

(Continued)

OTHER PUBLICATIONS

Usmail, C. L, Little, M. O., & Zuber, R. E. (2014). Evolution of embedded processing for wide area surveillance, IEEE A&E Systems Magazine, Jan., 6-13. (Year: 2014).*

(Continued)

*Primary Examiner* — Jigneshkumar C Patel
(74) *Attorney, Agent, or Firm* — Bond Schoeneck & King, PLLC; George McGuire

(57) ABSTRACT

Methods and systems for scalable high-performance embedded computing architectures. According to an embodiment, a scalable high-performance embedded computing system increases computational capability within the restrictive size, weight, and power constraints of systems such as the external pod payloads of unmanned aircraft systems, among many other possible systems. The core computer capability can be placed in various environments, and according to one embodiment utilizes a flight-certified aeronautics pod that is scalable in length. The scalable HPEC system can be connected to external data sources, or the nose and tail can be made of Radio Frequency transparent material, enabling the use of various RF sensing technologies within the same aeronautics enclosure. According to an embodiment, a lightweight, thermally-efficient conduction cooled chassis supports the required board and interface hardware.

15 Claims, 9 Drawing Sheets

(56) References Cited

U.S. PATENT DOCUMENTS

| | | | |
|---|---|---|---|
| 5,378,155 | A | 1/1995 | Eldridge |
| 6,094,171 | A | 7/2000 | Riddle et al. |
| 6,281,970 | B1 | 8/2001 | Williams et al. |
| 6,697,008 | B1 | 2/2004 | Sternowski |
| 6,873,287 | B2 | 3/2005 | Forsberg |
| 6,996,504 | B2 | 2/2006 | Novotny et al. |
| 7,931,198 | B2 | 4/2011 | Hall |
| 7,943,914 | B2 | 5/2011 | Chicklis et al. |
| 8,341,298 | B2 | 12/2012 | Wilber et al. |
| 8,527,115 | B2 | 9/2013 | Greenfeld et al. |
| 8,805,005 | B2 | 8/2014 | Jahangir et al. |
| 9,091,547 | B2 | 7/2015 | Stannard et al. |
| 2003/0071165 | A1* | 4/2003 | Fiebick .............. F41G 7/007 244/3.1 |
| 2005/0204910 | A1* | 9/2005 | Padan ............... B64D 1/04 89/1.813 |
| 2008/0102812 | A1* | 5/2008 | Chari ............... H01Q 1/283 455/424 |
| 2009/0173822 | A1 | 7/2009 | Kravitz et al. |
| 2010/0100286 | A1* | 4/2010 | Genissel ........... G05B 15/02 701/48 |
| 2010/0220441 | A1* | 9/2010 | Berlekamp ........ G06F 1/1656 361/679.54 |
| 2013/0304775 | A1 | 11/2013 | Davis et al. |
| 2014/0075506 | A1 | 3/2014 | Davis et al. |

OTHER PUBLICATIONS

Price (NPL: Thermal Design of an Airborne Computer Chassis With Air-Cooled, Cast Pin Fin Coldwalls (Published on Jan. 2005, vol. 127).*

Unknown "Airbus Deploys HP PODs" Constituent works. Jul. 10, 2014, 2 pages.

Barnell et al. "Integration and Development of the 500 TFLOPS Heterogeneous Cluster (Condor)" IEEE High Perform. Extreme Computer Conf. 2012, 4 pages.

Unknown "Electronic Warfare handbook 2008" The Shephard Press Ltd. Retrieved from: URL < http://www.aerospace-index.com/images/2006homeai/ewh2008.pdf, 60 pages.

Unknown "Advanced Capability Pod—ACaP" Exelis 2011. Retrieved from: http://www.exelisinc.com/solutions/ACaP/Documents/Exelis-ACaP.pdf, 2 pages.

Unknown "ELTA's Comprehensive Self-Protection Jamming Pod Configured to Enhance Aircraft Survivability" ELTA SIGINT & Communication Division. 2003. Retrieved from: http://www.iai.co.il/sip_storage/files/7/27537.pdf, 2 pages.

Unknown "Lockheed Martin Enhancing Capabilities of Sniper Targeting Pod" Access Intelligence LLC, 2006, 5 pages.

Vito. "Military Aircraft—Marconi Sky Shadow ECM" Aerei Militari 2010, 3 pages.

Mil & Aero staff. "Open systems architecture for airborne electro-optical sensor pods offered by Northrop Grumman" Northrop Grumman online. Jun. 8, 2015. Retrieved from URL: http://www.militaryaerospace.com/articles/2015/06/electro-optical-sensor.html, 2 pages.

Cenciotti. "Tag Archives: self-protection jamming pod" The Aviationist Patch. Dec. 4, 2010, 2 pages.

Unknown "The sky is no limit with HP PODs—Airbus doubles its usable supercomputing power with containerized HP Performance Optimized Datacenters (PODs)" Case Study—Hewlett-Packard Development Company, L.P. May 2013, 4 pages.

* cited by examiner

SCALABLE HIGH-PERFORMANCE EMBEDDED COMPUTING SYSTEMS

CROSS-REFERENCE TO RELATED APPLICATION

This application claims priority to U.S. Provisional Patent Application Ser. No. 62/327,622, filed on Apr. 26, 2016, and entitled "Scalable High-Performance Embedded Computing Systems," the entire disclosure of which is incorporated herein by reference.

STATEMENT REGARDING FEDERALLY SPONSORED RESEARCH OR DEVELOPMENT

This invention was made with government support under Contract No. FA875012C0124 (Department of the Air Force). The government has certain rights in the invention.

FIELD OF THE INVENTION

The present invention is directed to methods and systems for scalable high-performance embedded computing (HPEC) architectures.

BACKGROUND

Due to the explosive growth of embedded systems in consumer, industrial, and military equipment and applications, embedded computing and embedded computing systems have become ubiquitous. An embedded computing system is any computer that functions within a larger system, with one or more microcontrollers embedded in the component part or system which is part of a larger mechanical or electrical system. Typically, embedded computing systems have a dedicated or narrowly-defined purpose, and tend to be more rugged, cost-effective, smaller, and energy-efficient than general purpose computing systems. Embedded computing systems can range from very simple systems with a single microprocessor to very complicated systems with multiple processors and peripheral components mounted within a chassis or enclosure.

High-performance computing ("HPC") has different meanings in different areas, but it typically refers to distributed or parallel processing systems capable of both fast high-quantity processing. The speed of these super computing systems is typically measured in floating-point operations per second ("FLOPS"), with HPC systems capable of operating at teraFLOPS levels.

Scientific researchers and the military are both producers and consumers of HPC systems. For example, high performance embedded computing ("HPEC") solutions are needed to meet operational and tactical real-time processing intelligence surveillance and reconnaissance ("ISR") missions, among many other uses. However, current HPEC are not sufficiently scalable or adaptable, and exceed the desired size, weight, and power constraints.

Accordingly, there is a continued need in the art for improved HPEC systems that are scalable and are sufficiently small, lightweight, environmentally sealed, and energy-efficient for a variety of different applications including ISR among many others.

SUMMARY OF THE INVENTION

The present disclosure is directed to inventive methods and systems for scalable high-performance embedded computing architectures. According to an embodiment, the scalable HPEC system increases computational capability within the restrictive size, weight, and power constraints of systems such as the external pod payloads of unmanned aircraft systems, among many other possible systems. The core computer capability can be placed in various environments, and according to one embodiment utilizes a flight-certified aeronautics pod that is scalable in length. The scalable HPEC system can be connected to external data sources, or the nose and tail can be made of Radio Frequency ("RF") transparent material, enabling the use of various RF sensing technologies within the same aeronautics enclosure. According to an embodiment, a lightweight, thermally-efficient conduction cooled chassis supports the required board and interface hardware.

According to one aspect is an embedded computing system. The system includes: (i) an elongated aeronautics pod, wherein the aeronautics pod comprises an air inlet configured to receive ambient air, an air duct configured to receive the ambient air from the air inlet and deliver it to the interior of the aeronautics pod, and an air outlet configured for air to exit the aeronautics pod; and (ii) a chassis positioned within the aeronautics pod and comprising a processor, wherein the chassis is configured to be cooled by a flow of air inside the interior of the aeronautics pod.

According to an embodiment, an exterior surface of the aeronautics pod comprises one or more mounting interfaces.

According to an embodiment, the chassis is environmentally sealed.

According to an embodiment, the system comprises multiple RF sensing technologies.

According to an embodiment, the system is connected to an external data source configured to obtain data externally and communicate the obtained data to the chassis.

According to an embodiment, the processor comprises a plurality of heterogeneous processing boards.

According to an embodiment, the system comprises software configured for real-time processing. According to an embodiment, the software utilizes an Air WASP™ framework.

According to an embodiment, at least a portion of the aeronautics pod comprises a radio frequency transparent material.

According to an aspect is an embedded computing system. The system includes: (i) an aeronautics pod comprising: an air inlet configured to receive ambient air; an air duct configured to receive the ambient air from the air inlet and deliver it to the interior of the aeronautics pod; an air outlet configured for air to exit the aeronautics pod; and an exterior surface comprising one or more mounting interfaces; and (ii) an environmentally sealed chassis positioned within the aeronautics pod and comprising a processor configured to execute software for real-time processing of sensor data, wherein the chassis is configured to be cooled by a flow of air inside the interior of the aeronautics pod.

According to an embodiment, the system is connected to an external data source configured to obtain data externally and communicate the obtained data to the chassis.

According to an embodiment, at least a portion of the aeronautics pod comprises a radio frequency transparent material.

According to an aspect is a real-time data processing system. The system includes: (i) an aeronautics pod; and (ii) a chassis positioned within the aeronautics pod and comprising a power supply, and further comprising a processor configured to execute software for real-time processing of sensor data obtained by the real-time data processing system.

According to an embodiment, the system is connected to an external data source configured to obtain data externally and communicate the obtained data to the chassis.

According to an embodiment, the aeronautics pod comprises one or more fans configured to move air through the pod.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure describes various embodiments of a method and system for a scalable high-performance embedded computing system. According to an embodiment, the scalable HPEC system 10 improves cost, size, weight, and power (C-SWaP) variables. The HPEC can be utilized in various environments, and according to one embodiment the design utilizes a 12-inch diameter flight-certified aeronautics pod that is scalable in length. The HPEC system 10 can be connected to external data sources, and/or the nose and tail can be made of RF transparent material, enabling the use of various RF sensing technologies within the same aeronautics enclosure. Inside the pod is a lightweight, thermally-efficient conduction cooled (with unconditioned ambient air) chassis that supports the required board and interface hardware. According to an embodiment, the system includes one or more single board computers (SBC), such as $4^{th}$-generation Intel® Core™ i7-based rugged 3U VPX, a type of single board computer, and one or more processing boards, such as 3U VPX high-performance quad-channel graphic processing boards. While being completely scalable, one embodiment of the design provides 7,476 GFLOPS (or gigaFLOPS) of computing power and utilizes 464 Watts in a chassis that is 25.8 pounds. According to an embodiment, the chassis and pod weigh 49.6 pounds and the ratio of processing to power is over 16 GFLOPS/Watt. According to an embodiment, the HPEC system 10 comprises software designed for real-time processing, but also supports non-real time processing in air, ground and sea scenarios. This scalability helps meet the needs of both traditional and future signal processing requirements such as emerging neuromorphic computing techniques and analyses of data sets that are so large or complex that traditional data processing applications are inadequate. The HPEC system 10 brings high-performance computing closer to sensors and immediately enables future research and development efforts in neuromorphic computing and autonomous system operations.

Figure 1:
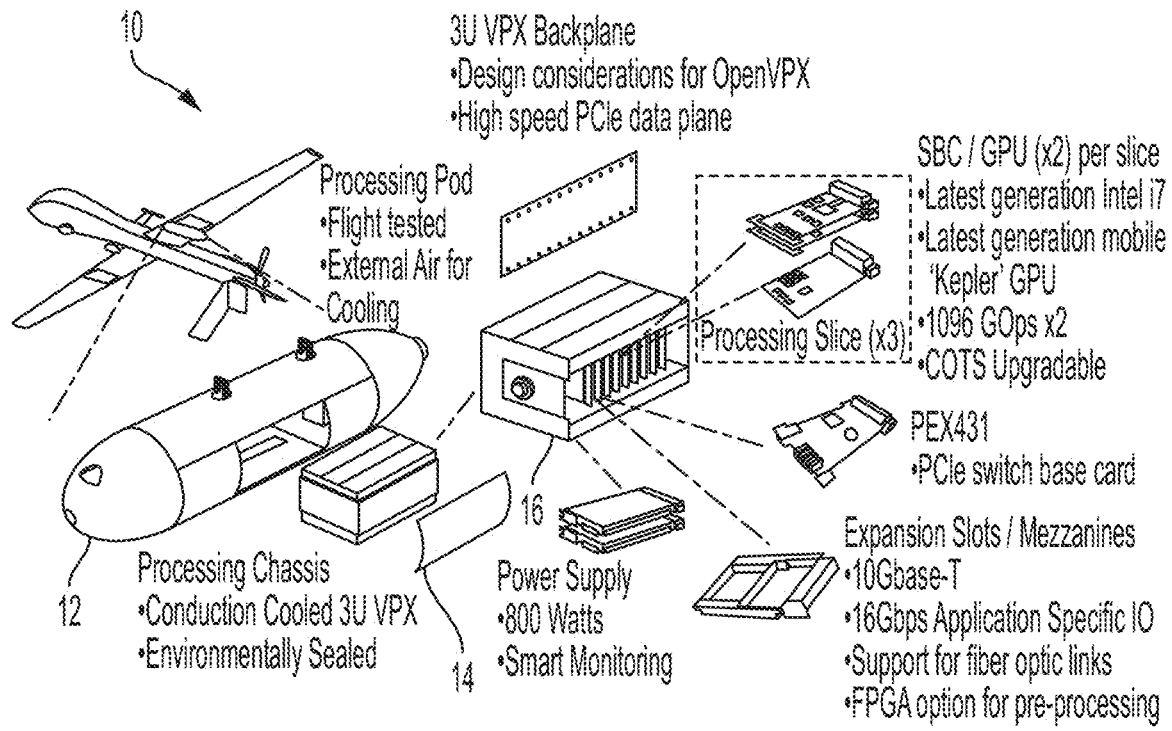
FIG. 1 is a schematic representation of a high-performance embedded computing ("HPEC") system, in accordance with an embodiment.
Figure 2:
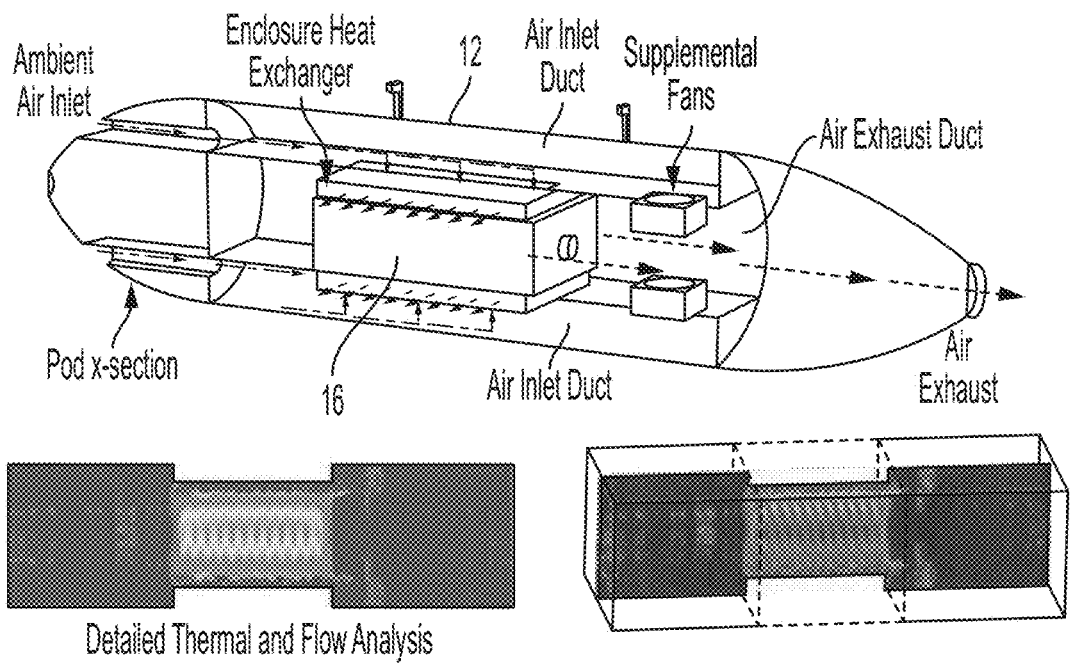
FIG. 2 is a schematic representation of thermal management and design for an HPEC system, in accordance with embodiment.
Figure 3:
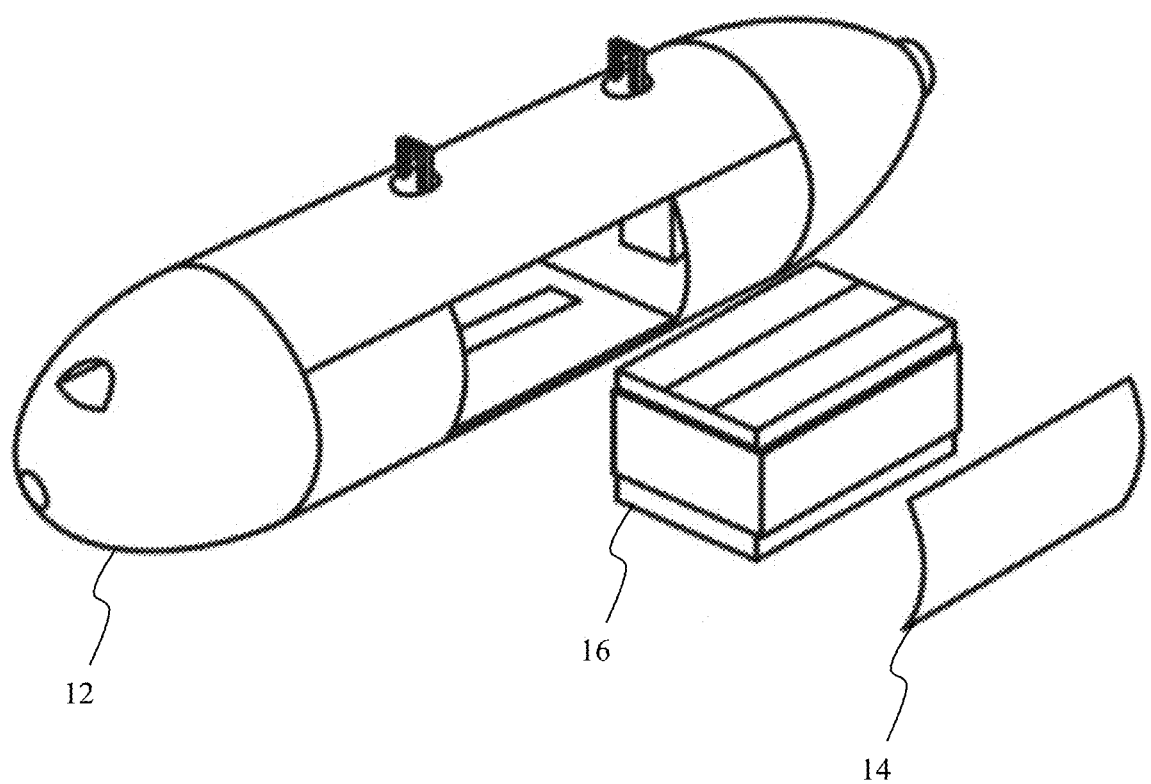
FIG. 3 is a schematic representation of an aeronautics pod and chassis for an HPEC system, in accordance with an embodiment.

Referring to FIGS. 1-3, in accordance with an embodiment, is an example of an HPEC system. According to an embodiment, the HPEC system comprises a ruggedized design as described or otherwise envisioned herein that provides the necessary aeronautics pod, electronics chassis, processing hardware, data throughput, and thermal management to support various signal and information processing applications. For example, the system's design is suitable for, but is not limited to, full motion video infrared, audio, Synthetic Aperture Radar (SAR), optical, passive and active sensing, massive analytics, information fusion, and moving target indication (MTI) processing, among many other uses. According to an embodiment, the system utilizes field programmable gate arrays (FPGA), central processing units (CPU) and/or graphics processing units (GPU). As a result, the system can provide a heterogeneous distributed computing environment for system developers.

Referring to FIG. 1, in accordance with an embodiment, is an HPEC system 10. The system can comprise, for example, an aeronautics pod 12. Referring to FIG. 3, for example, is an embodiment of the aeronautics pod 12. One or more panels or sides 14 allow access to the interior of the pod 12 for installation, inspection, repair, or other necessary access to interior components such as chassis 16. The aeronautics pod 12 can be, for example, cooled by external air when it is in flight, particularly at higher altitudes.

According to an embodiment, the aeronautical pod can, for example, install on a standard 14-in pylon and the access hatches allow maintenance of the payload without removal from the platform. The 12"-diameter pod's length is scalable between 51.5 inches and 85.5 inches (a 26 to 60 inch center section) and under many circumstances can be modified without affecting its flight certification. This provides a level of flexibility and the capacity to add even more processing or sensing capabilities to the system. Many other shapes, sizes, and configurations are possible.

According to an embodiment, the HPEC system 10 comprises a design for severe environment applications, with high levels of shock and vibration, small space envelope and restricted cooling supplies. For example, the system can be designed to support shock 40 g peak saw-tooth for an 11 millisecond duration, 95% humidity, operating from −40 degrees Celsius to +50 degrees Celsius, and stored from −50 degrees Celsius to 100 degrees Celsius, among many other parameters.

According to an embodiment, a low-weight and thermally efficient design can be achieved through the thermal analysis by utilizing ambient air cooling of the processing modules. Referring to FIG. 2, for example, is a possible embodiment of a cooling system for aeronautics pod 12. Unconditioned ambient air that enters the pod 12 via one or more air inlets during flight is used for system thermal management, as the air is directed over the payload, (chassis 16) and exhausted out the rear of the pod. Integrated ducts, within the pod 12, sized for the required pressure and air flow rate direct the airflow as shown in FIG. 2. According to an embodiment, the electronic chassis 16 can be designed with a folded fin heat exchanger built within the top and bottom of the enclosure. Heat from the internal modules to the chassis 16 is conducted through the top and bottom walls that are in contact with the modules. On the external surface of these walls are the folded fins. Air is forced into the top and bottom of the enclosure, directed through the fins, and out the right and left sides of the enclosure. The heated air is then exhausted out at the rear of the pod 12.

Figure 4:
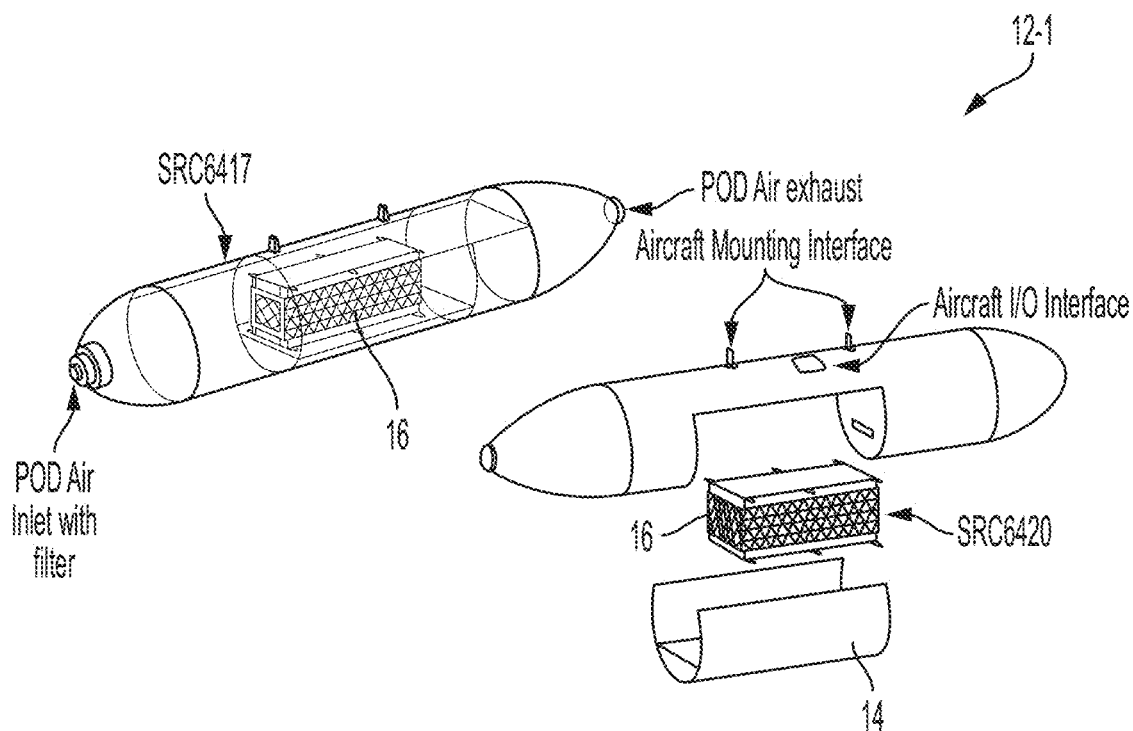
FIG. 4 is a schematic representation of an aeronautics pod and chassis for an HPEC system, in accordance with an embodiment.
Figure 5:
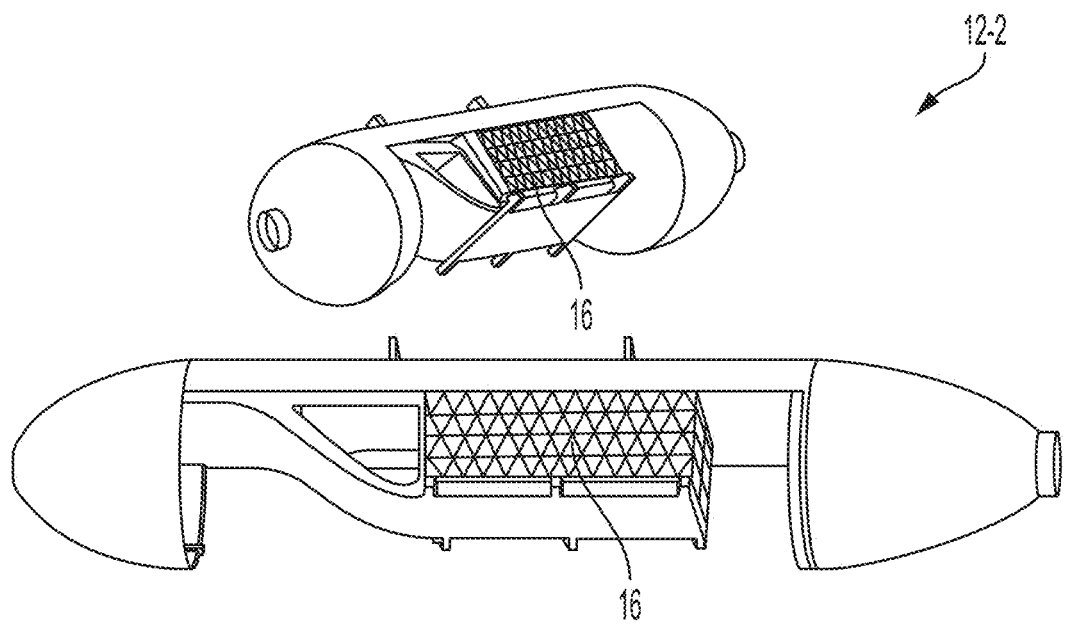
FIG. 5 is a schematic representation of an aeronautics pod and chassis for an HPEC system, in accordance with an embodiment.
Figure 6:
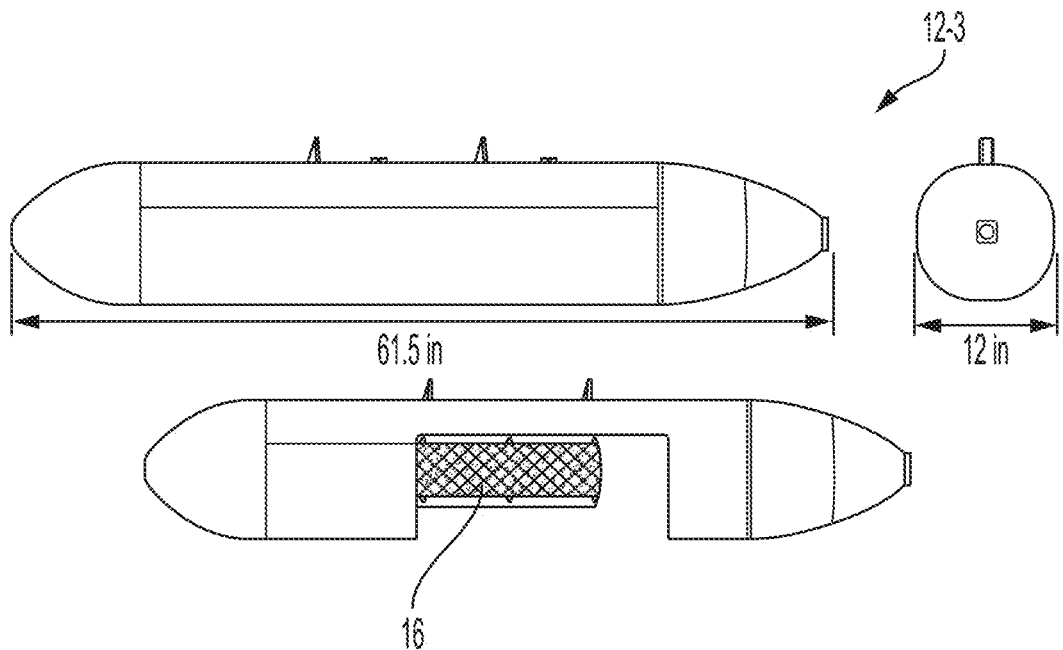
FIG. 6 is a schematic representation of an aeronautics pod and chassis for an HPEC system, in accordance with an embodiment.
Figure 7:
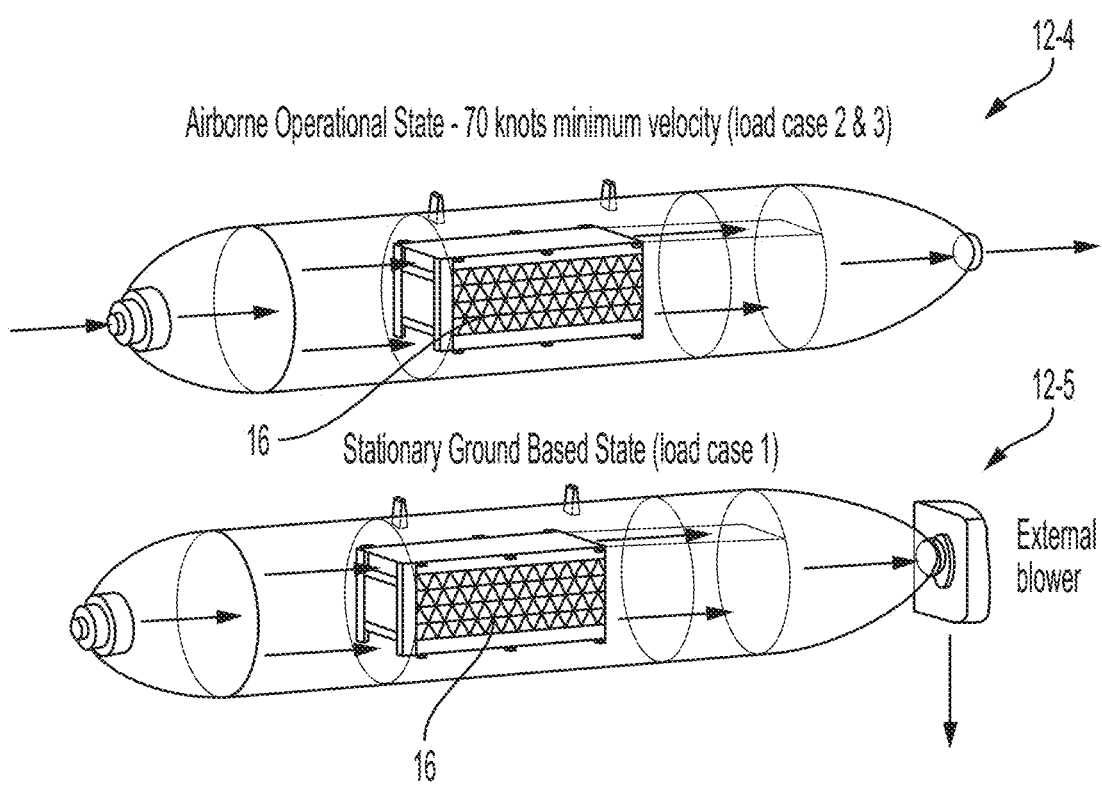
FIG. 7 is a schematic representation of an aeronautics pod and chassis for an HPEC system, in accordance with an embodiment.

Referring to FIGS. 4-7 are various embodiments of the aeronautics pod 12. For example, FIG. 4 depicts an aeronautics pod 12-1 with an air inlet and outlet, and a panel for chassis 16 access. The aeronautics pod 12-1 also comprises one or more mounting interfaces configured to allow the pod to be mounted to one or more different vehicles, such as an airplane, among other types of vehicles. FIGS. 5 and 6 depict various configurations of an aeronautics pod 12, including possible measurements although many other variations are possible. FIG. 7 is a schematic representation of an airborne aeronautics pod 12-4 versus a stationary aeronautics pod 12-5. As shown in FIG. 7, an external blower may be needed to push and/or pull air through the pod to cool the chassis 16.

HPEC system 10 in FIG. 1 may also comprise a processing chassis 16 configured to carry out one or more functions of the system. The chassis 16 may be cooled to protect the components and/or improve functioning, including by conduction cooling among many other options. The chassis 16 may also be environmentally sealed to protect the components from contaminants and other environmental factors such as temperature, dust, and the like.

According to an embodiment, the HPEC system 10 comprises an electronics chassis 16 designed using conduction-cooled 3U OpenVPX. In addition, the system is scaled in volume and thermal management capacity to accommodate future capability expansion. According to one embodiment is a scalable configuration for a populated chassis. The chassis 16 can have, for example, a baseline configuration of 14 slots and space for 9 3U VPX compute modules, although many other configurations are possible.

Figure 8:
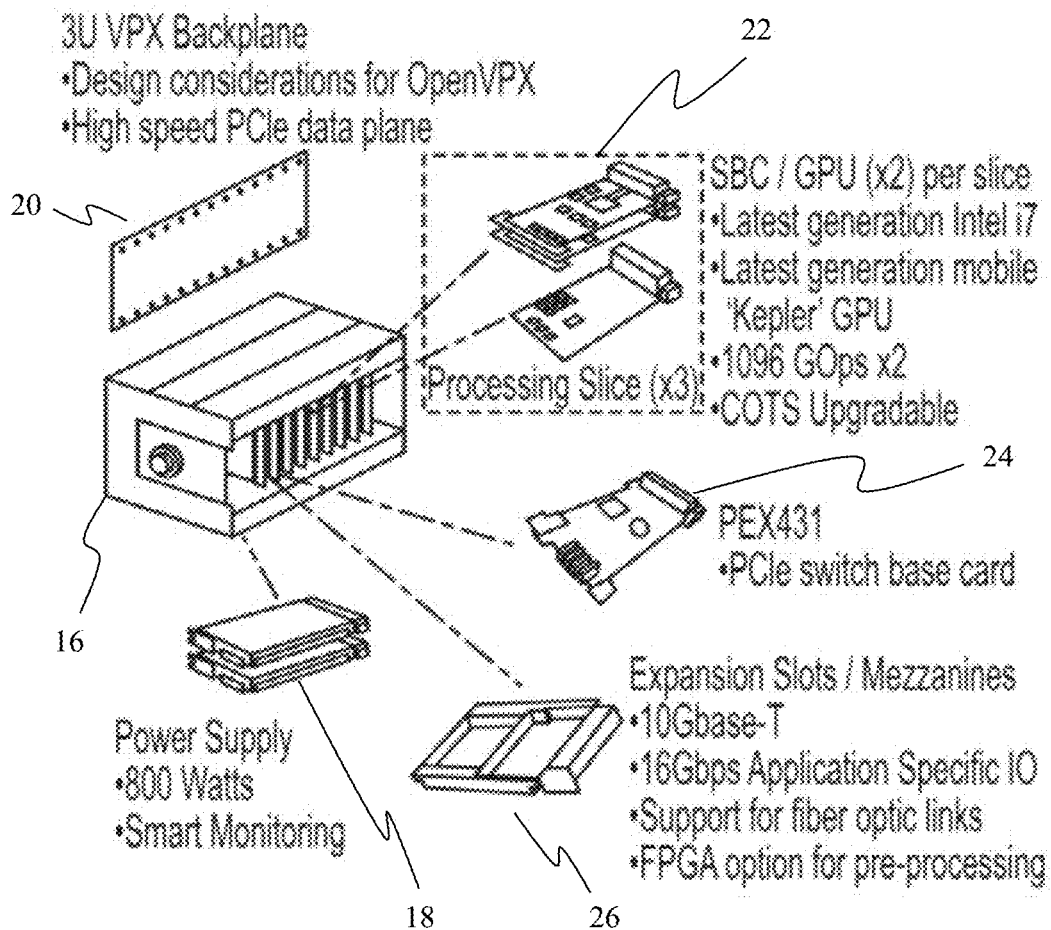
FIG. 8 is a schematic representation of a chassis for an HPEC system, in accordance with an embodiment.

Referring to FIG. 8, in accordance with one embodiment, is a possible chassis 16 for the HPEC system 10. The chassis 16 may comprise a power supply 18 to provide power to the chassis 16 components. For example, the power supply may be an 800 watt power supply, although many other power supplies are possible, such as an 1800 watt power supply (such as +12 Volts (V) at 115 Amperes (A)).

Among many other components, the chassis 16 may comprise a backplane 20, such as an OpenVPX Backplane exchanger, although many other variations are possible. The chassis 16 may also comprise a single board computer (SBC) 22. The SBC 22 can be, for example, a rugged OpenVPX 3U, although many other configurations and systems are possible. The result is a set of SWaP characteristics with high levels of performance. The SBC 22 can include, for example, a Mobile Intel® QM87 Express chipset, a type of chipset which provides a high level of I/O bandwidth for both on-board and off-board functions. The x16 PCI Express link (Gen3-capable) provides maximum bandwidth to high-performance peripherals such as the HPEC system's 10 general purpose GPUs. Each processing slice contains one SBC card. As technology improves, this component can be updated to the latest generation during a technology refresh. Accordingly, many other embodiments and variations are possible.

According to an embodiment, the HPEC system 10 comprises a bus 24 such as, for example, Peripheral Component Interconnect Express (PCIe or PCI-Express). The bus 24 can be, for example, a PEX431 multi-fabric switch, and can include an XMC carrier card that allows the system to make use of multiple I/O standards including PCI-express and Gigabit Ethernet. The XMC card plugs into the PEX431. Up to six ports of 4-lane PCI Express can be implemented to support the complex multi-node architecture that enables the HPEC system 10 to be flexible and agile in numerous demanding processing applications across many air, ground, and sea domains.

According to an embodiment, the HPEC system 10 comprises one or more expansion slots 26 for additional components or elements. There may be support for many different types of links, including but not limited to fiber optic links. According to an embodiment, the HPEC system 10 comprises an FPGA I/O interface board. The FPGA I/O interface board can be, for example, a highly flexible processing mezzanine that mounts to the PCI-express switch board using VITA 42.3 XMC Mezzanine slot. The board can utilize, for example, the latest generation Xilinx Virtex®-7 FPGA, a type of field-programmable gate array, with 108,300 logic slices, 2,880 digital signal processor slices, 80 transceivers capable of up to 13.1 Gb/s maximum rate, and 52,920 kb of block RAM. As noted above, eight pairs of transceivers are connected to the base card with up to 5 Gb/s data transfer rate per connection from the fiber transceiver board. According to an embodiment, the board contains supporting flash and 2 GB of DDR3 SDRAM for buffering and pre-processing of data as it streams into the processing slices. Many other embodiments and variations are possible.

According to an embodiment, the HPEC system 10 comprises a fiber transceiver board. According to one embodiment is a fiber transceiver board comprising 10 densely packed, fiber-optic to copper differential pair transceivers. In this embodiment, eight pair, with 5 Gb/s per pair, are connected to the input/output (I/O) interface board for a 4 GB/s data transfer pipe, into the processing slices from an external sensor. The fiber transceivers are designed for harsh environments, and have wide-operating parameters, to support a wide variety of data formats. This allows the system to be easily updated and adapted to additional sensors in the future. Many other embodiments and variations are possible.

According to an embodiment, the HPEC system 10 comprises state-of-the-art processors for highly demanding applications. This is accomplished using the numerous processing cores of the graphics processing unit (GPU). According to an embodiment, each processing slice contains two GPU cards. As technology improves, this component can be updated to the latest generation during a technology refresh.

Figure 9:
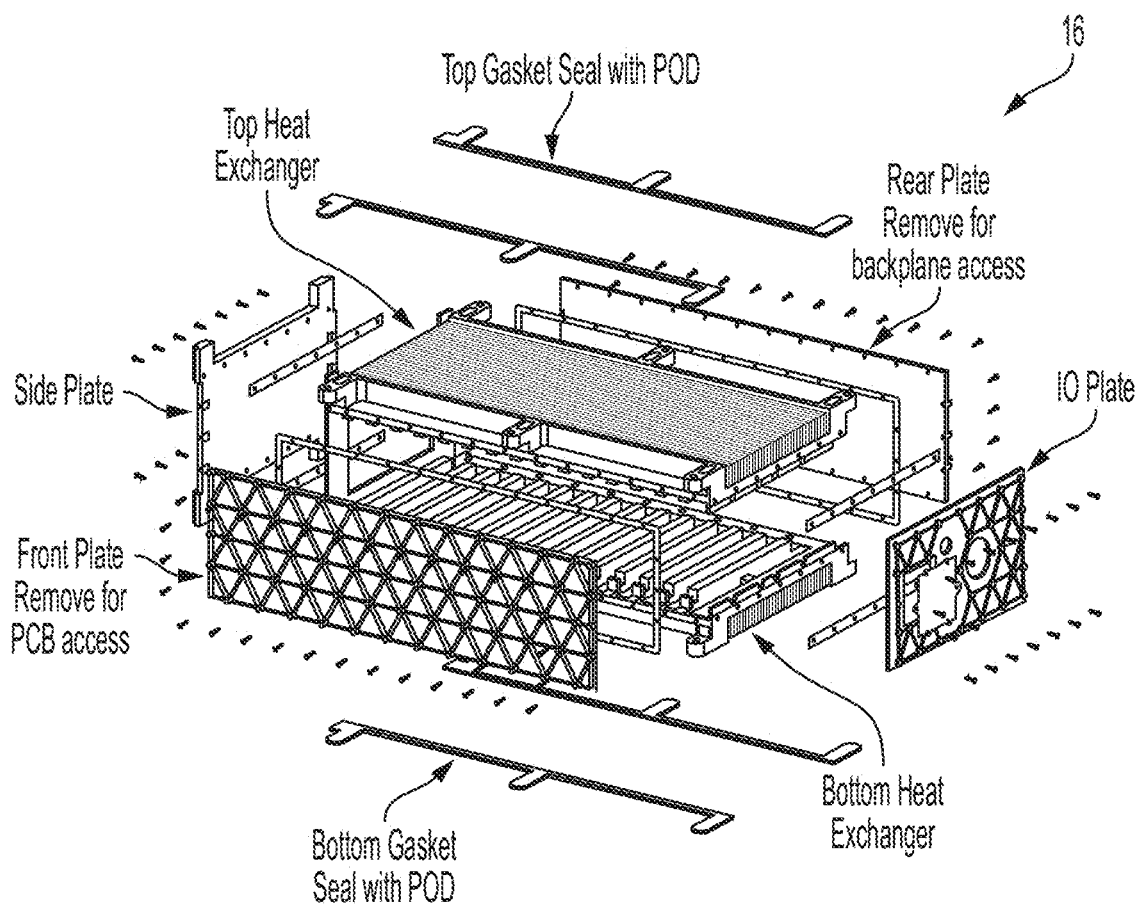
FIG. 9 is a schematic representation of a chassis enclosure for an HPEC system, in accordance with an embodiment.
Figure 10:
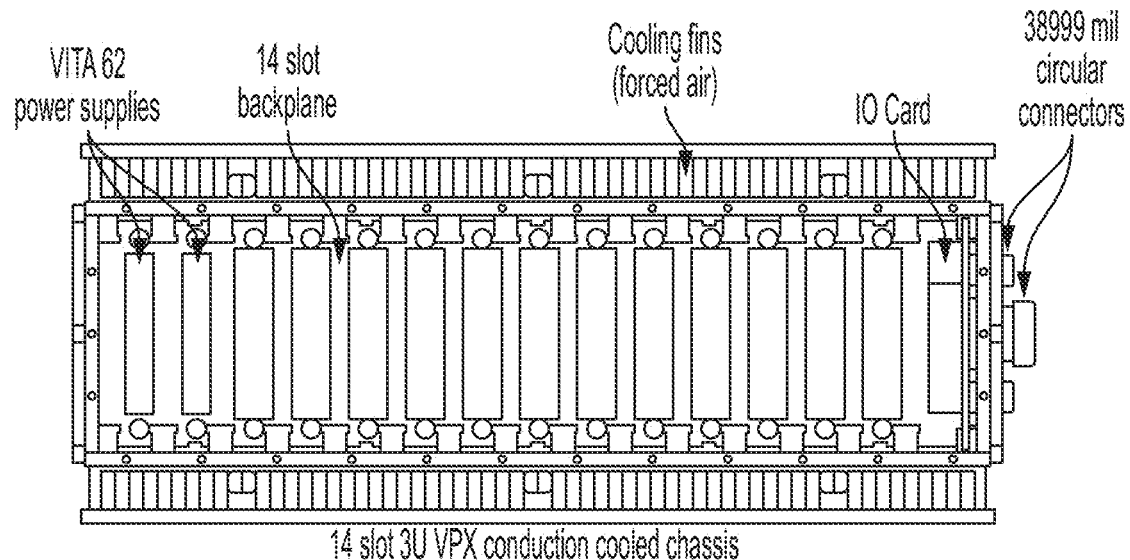
FIG. 10 is a schematic representation of a portion of chassis for an HPEC system, in accordance with an embodiment.

Referring to FIG. 9, in one embodiment, is an exploded view of a chassis 16 enclosure. The chassis 16 enclosure can comprise, for example, an environmentally sealed system with an I/O plate and one or more heat exchangers. Referring to FIG. 10, in one embodiment, is a side view of the chassis 16.

These are just possible examples of the HPEC system 10, and many different improvements and variations on these designs are possible.

HPEC System Software Architecture

HPEC system 10 comprises a software component configured, programmed, or otherwise adapted to perform one or more of the functions described or otherwise envisioned herein. The software is stored on a non-transitory storage medium aboard the system, and this software is executed by a processor to perform the described functionality.

According to an embodiment, the HPEC system 10 utilizes a software architecture such as an Airborne Wide Area Signal Processing (Air WASP™) framework. The Air WASP™ framework provides an existing, adaptable, portable, distributed analytics framework. The capabilities of this framework have been demonstrated by performing real-time SAR processing on a hybrid distributed CPU-GPU system. Previous work has investigated using GPUs, or alternative processors, for improving the performance of SAR processing. SAR processing is very applicable, and it is perfectly suited for demonstrating the framework's capabilities, since it requires extensive processing and data throughput. The Air WASP™ framework can be leveraged for other emerging or existing algorithms, making it non-specific and widely applicable beyond SAR, e.g., emerging cognitive, adaptive, multi-mode, multi-function information processing.

Figure 11:
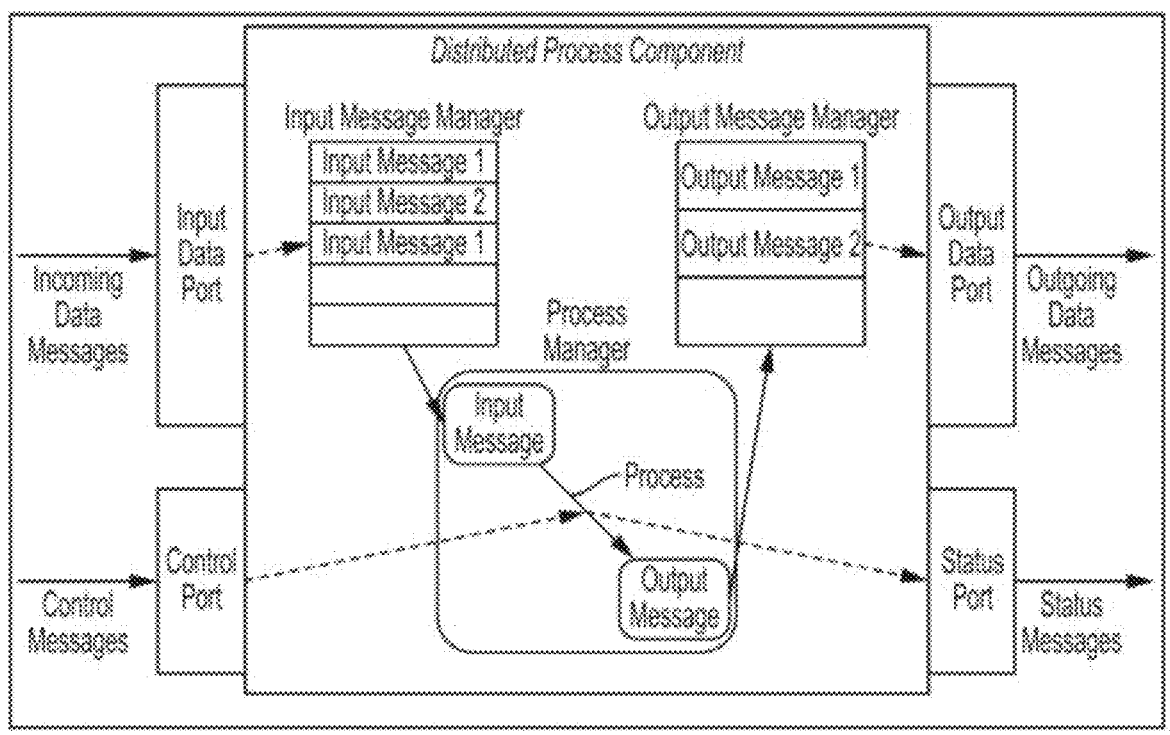
FIG. 11 is flowchart of a method for processing in the HPEC system, in accordance with an embodiment.

According to an embodiment, the HPEC systems 10 described or otherwise envisioned herein utilize a novel software framework developed with scalability and portability such that the same software can run on a massively parallel supercomputer or a modest embedded system. The Air WASP™ framework enables users to rapidly create, multi-threaded, multi-node, multi-platform, distributed applications from palettes of distributed processing components. Referring to FIG. 11, in one embodiment, is a flow chart representation of the high-level design of an Air WASP™ distributed processing component.

Figure 12:
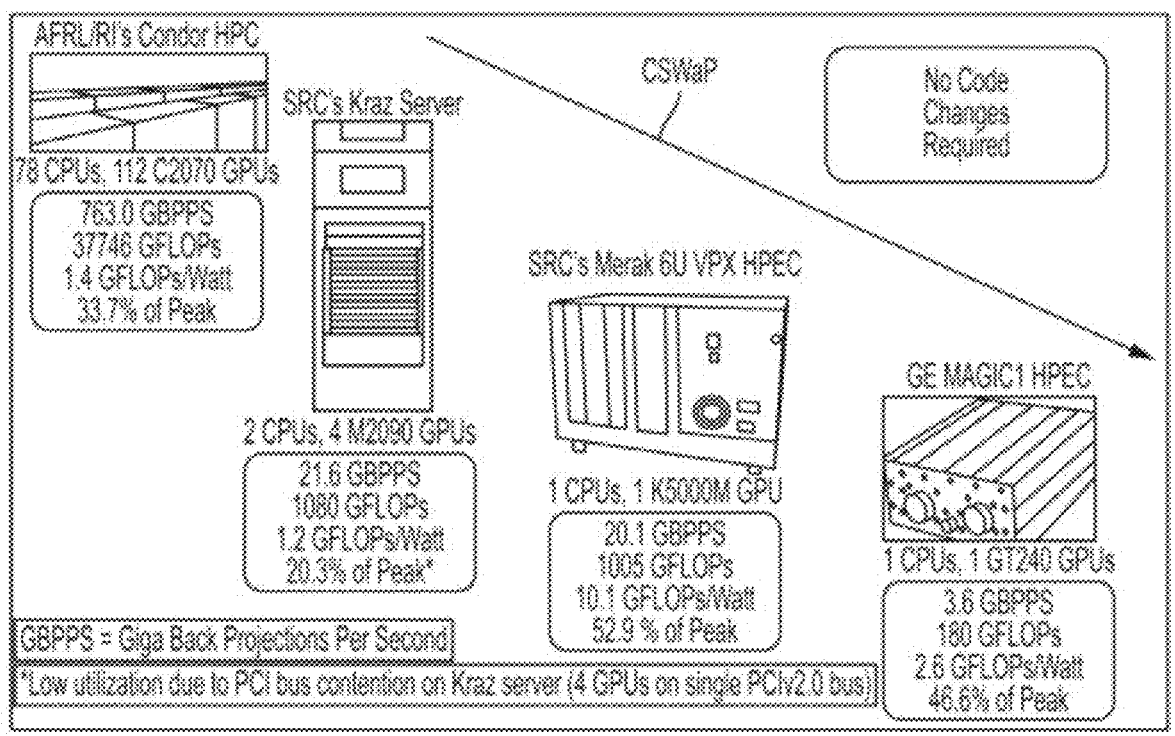
FIG. 12 is a graphic representation of the capabilities of an Air WASP™ framework, in accordance with an embodiment.

The Air WASP™ framework is also designed to be configurable and allow for various tradeoffs. This provides for processing alternatives, which facilitate a rapid response to quickly changing computing needs, based upon user needs. Referring to FIG. 12 is a graphic representation of the capabilities of the Air WASP™ framework, including flexibility, portability, during the implementation of SAR image formation algorithms on various hardware architectures.

According to one embodiment of the HPEC system 10 utilizing an Air WASP™ framework, the system can provide 21 TeraFLOPS @ 1400 watt maximum resulting in 15 GFLOPS/Watt. In this embodiment, the system has a depth of 20.50", a height of 19.25", and a width of 17.00". The system can comprise redundant power supplies, hot swap power supplies, hot swap backplanes, a system monitor, a fan monitor, and a temperature monitor, among other components. The system can comprise an OpenVPX Backplane exchanger and an 1800 watt power supply (such as +12 Volts (V) at 115Amperes (A)). This is provided as just one possible example of the HPEC system 10, and many different improvements and variations on this design are possible.

HPEC System Processing

SAR full backprojection (BP) is an algorithm used to form SAR imagery from stripmap or spotlight collections. The algorithm is flexible, in that it can be used with data that was collected, regardless of the geometry of the collection. Other image formation algorithms exist, although many require motion compensation to a line or point, which can introduce image artifacts, especially in images whose scene extent is large compared to the slant range. However, the image quality of full BP comes with significant computational burden. As a result, the implementation of real-time full BP for high resolution images with wide scene extents is a formidable challenge.

Figure 13:
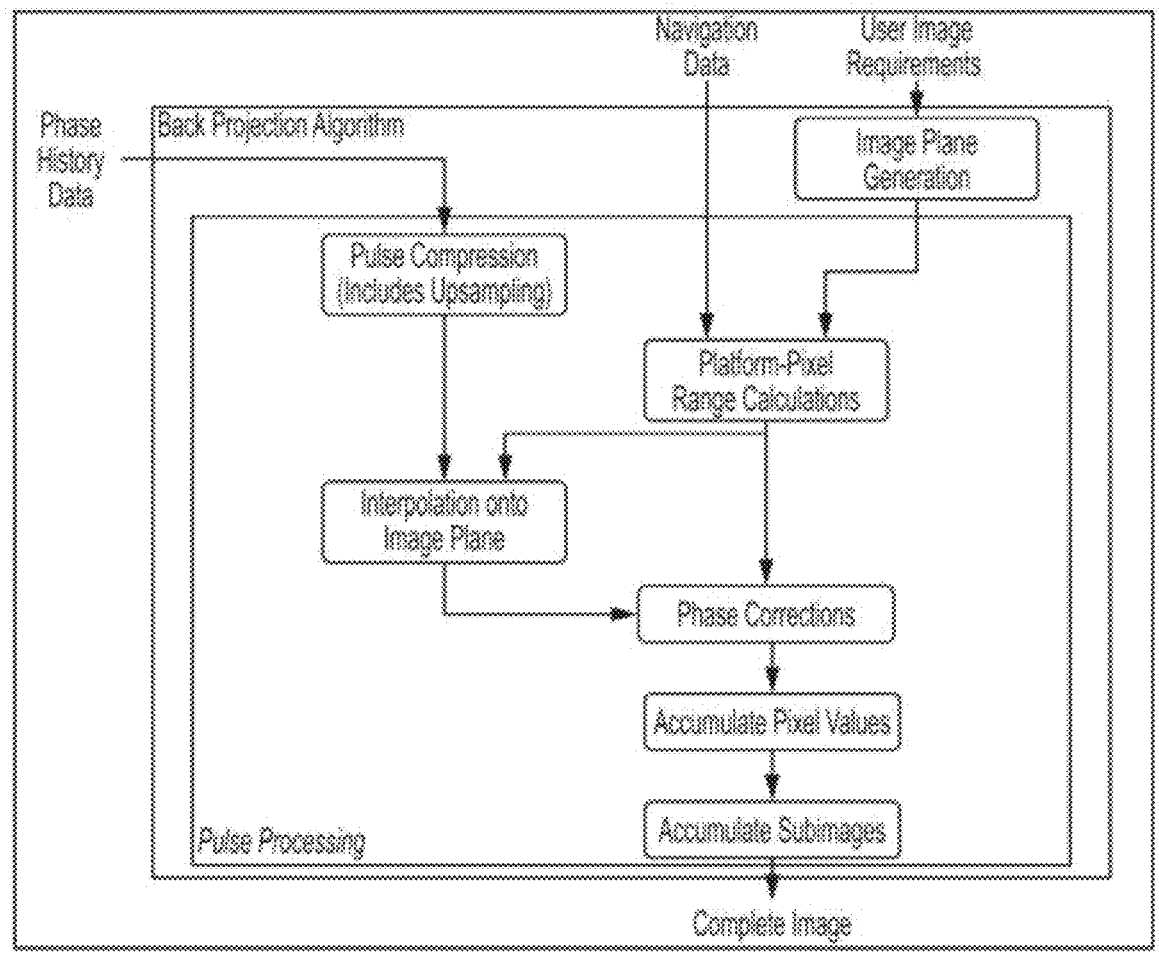
FIG. 13 is a flowchart of a method for SAR backprojection, in accordance with embodiment.

According to an embodiment, the basic flow of an embodiment of the BP algorithm is illustrated in FIG. 13. For an image pixel at location $loc_{xy}$, the image value $i_{xy}$ is given as follows:

$$i_{xy} = \sum_{pulse=1}^{N_{pulses}} D(r_{xy}(\text{pulse}), \text{pulse}) e^{-j4\pi r_{xy}(\text{pulse})/\lambda}$$

$$r_{xy}(\text{pulse}) = \|loc_{xy} - loc_{apc}(\text{pulse})\|$$

where D represents the 2-dimensional matrix of range compressed data samples (fast time, slow time), Npulses represents the number of pulses integrated into the image, λ represents the imaging wavelength, $loc_{apc}$ represents the per-pulse antenna phase center location, $loc_{xy}$ represents pixel location, and r represents the per-pulse platform-to-pixel range.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, and/or method described herein. In addition, any combination of two or more such features, systems, articles, materials, kits, and/or methods, if such features, systems, articles, and/or methods are not mutually inconsistent, is included within the scope of the present disclosure.

A "module" or "component" as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An embedded computing system, the system comprising:
   an elongated aeronautics pod extending along a longitudinal axis and comprising first and second ends, an air inlet positioned at the first end, an air duct extending parallel to the longitudinal axis configured to receive the ambient air from the air inlet, and upper and lower air duct outlets configured to permit air to exit the air duct and an air outlet positioned at the second end and configured for air to exit the aeronautics pod; and
   a chassis positioned within the aeronautics pod, and comprising a top positioned adjacent and in fluid communication with the upper air duct outlet, a bottom positioned adjacent and in fluid communication with the lower air duct outlet, left and right sides each of which contain an air outlet, and a processor, wherein the chassis is configured to be cooled by the ambient air being forced into the top and the bottom of the chassis without the aid of a fan positioned within the chassis and out the left and the right sides of the chassis wherein the air can exit the pod through said air outlet.

2. The embedded computing system of claim 1, wherein an exterior surface of the aeronautics pod comprises one or more mounting interfaces.

3. The embedded computing system of claim 1, wherein the chassis is environmentally sealed.

4. The embedded computing system of claim 1, wherein the system comprises multiple RF sensing technologies.

5. The embedded computing system of claim 1, wherein the system is connected to an external data source configured to obtain data externally and communicate the obtained data to the chassis.

6. The embedded computing system of claim 1, wherein the processor comprises a plurality of heterogeneous processing boards.

7. The embedded computing system of claim 1, wherein the system comprises software configured for real-time processing.

8. The embedded computing system of claim 7, wherein the software utilizes a distributed analytics framework.

9. The embedded computing system of claim 1, wherein at least a portion of the aeronautics pod comprises a radio frequency transparent material.

10. An embedded computing system, the system comprising:
    An aeronautics pod extending along a longitudinal axis comprising:
       first and second ends;
       an air inlet positioned at the first end and configured to receive ambient air;
       an air duct extending parallel to the longitudinal axis and configured to receive the ambient air from the air inlet;
       upper and lower air duct outlets configured to permit air to exit the air duct;
       an air outlet positioned at the second end and configured for air to exit the aeronautics pod;
       an exterior surface comprising one or more mounting interfaces; and
       an environmentally sealed chassis positioned within the aeronautics pod and comprising a top positioned adjacent and in fluid communication with the upper air duct outlet, a bottom positioned adjacent and in fluid communication with the lower air duct outlet, a processor configured to execute software for real-time processing of sensor data, wherein the chassis is configured to be cooled by a flow of air inside the interior of the chassis.

11. The embedded computing system of claim 10, wherein the system comprises multiple RF sensing technologies.

12. The embedded computing system of claim 10, wherein the system is connected to an external data source configured to obtain data externally and communicate the obtained data to the chassis.

13. The embedded computing system of claim 10, wherein the processor comprises a plurality of heterogeneous processing boards.

14. The embedded computing system of claim 10, wherein the software utilizes a distributed analytics framework.

15. The embedded computing system of claim 10, wherein at least a portion of the aeronautics pod comprises a radio frequency transparent material.

* * * * *